US012675636B2

(12) United States Patent
He et al.

(10) Patent No.: US 12,675,636 B2
(45) Date of Patent: Jul. 7, 2026

(54) METHOD AND SYSTEM FOR ANALYZING TEXTS

(71) Applicant: Logistics and Supply Chain MultiTech R&D Centre Limited, Hong Kong (HK)

(72) Inventors: Meiqi He, Hong Kong (HK); Chun Fai Chan, Hong Kong (HK); Chung Dak Shum, Hong Kong (HK)

(73) Assignee: Logistics And Supply Chain/MultiTecch R&D Centre Ltd, Hong Kong (HK)

( * ) Notice: Subject to any disclaimer, the term of this patent is extended or adjusted under 35 U.S.C. 154(b) by 477 days.

(21) Appl. No.: 18/191,143

(22) Filed: Mar. 28, 2023

(65) Prior Publication Data

US 2024/0330591 A1 Oct. 3, 2024

(51) Int. Cl.
G06F 40/284 (2020.01)
G06F 40/30 (2020.01)
G06F 40/58 (2020.01)

(52) U.S. Cl.
CPC ............ G06F 40/30 (2020.01); G06F 40/284 (2020.01); G06F 40/58 (2020.01)

(58) Field of Classification Search
CPC ............ G10L 15/1815; G10L 15/1822; G10L 15/193; G10L 15/197; G06F 16/50; G06F 16/3329; G06F 16/338; G06F 16/35; G06F 16/90332; G06F 40/45; G06F 40/42; G06F 40/44; G06F 40/51; G06F 40/55; G06F 40/56; G06F 40/58; G06F 40/35

USPC ............................................................ 704/9
See application file for complete search history.

(56) References Cited

U.S. PATENT DOCUMENTS

| | | | | | |
|---|---|---|---|---|---|
| 8,612,204 | B1 * | 12/2013 | Uszkoreit | ............... | G06F 40/45 704/2 |
| 2004/0254783 | A1 * | 12/2004 | Isahara | .................... | G06F 40/55 704/9 |
| 2005/0228643 | A1 * | 10/2005 | Munteanu | ............... | G06F 40/42 704/9 |
| 2009/0083023 | A1 * | 3/2009 | Foster | ..................... | G06F 40/45 704/3 |

(Continued)

FOREIGN PATENT DOCUMENTS

| | | |
|---|---|---|
| CN | 110866407 A | 3/2020 |
| CN | 113887191 A | 1/2022 |
| CN | 114638239 A | 6/2022 |

*Primary Examiner* — Vijay B Chawan
(74) *Attorney, Agent, or Firm* — GableGotwals

(57) ABSTRACT

The invention provides a computer-implemented method and system for analyzing texts. The method comprises the steps of identifying one or more sentences of a first text in a first language; identifying one or more sentences of a second text in a second language; translating the identified one or more sentences of the first text from the first language into the second language; processing the sentences of the first text in the second language and the sentences of the second text in the second language into a first representation of the sentences of the first text, and a second representation of the sentences of the second text; and comparing the first representation of sentences of the first text with the second representation of sentences of the second text to identify one or more sentences of similarity between the first text and the second text.

11 Claims, 4 Drawing Sheets

(56)     References Cited

U.S. PATENT DOCUMENTS

| | | | |
|---|---|---|---|
| 2010/0076943 A1* | 3/2010 | Chen ...................... | G09B 19/06 |
| | | | 707/E17.015 |
| 2013/0103382 A1* | 4/2013 | Kim ................... | G06F 16/3344 |
| | | | 704/2 |
| 2017/0132217 A1* | 5/2017 | Na ......................... | G06N 3/044 |
| 2022/0093088 A1* | 3/2022 | Rangarajan Sridhar ..................... | |
| | | | G06F 16/338 |
| 2023/0079147 A1* | 3/2023 | Hewavitharana .. | G06Q 30/0623 |
| | | | 704/4 |
| 2023/0367977 A1* | 11/2023 | Nagata ................... | G06F 40/58 |
| 2024/0012996 A1* | 1/2024 | Chosa ................... | G06N 5/041 |

* cited by examiner

| Domain | Source | Paired Count | Intersection Count | Intersection % |
|---|---|---|---|---|
| Legal | HK-elegislation | 464,289 | 321,161 | 69.17% |
| Finance | SFCHK | 53,941 | 34,649 | 64.23% |
| Legal | HK-Judiciary | 43,611 | 26,257 | 60.21% |
| Legal | UN/Securtiy Council | 375,170 | 334,820 | 89.24% |
| Finance | BolsaDeMadrid | 1,517 | 884 | 58.27% |
| Total | | 938,528 | 717,771 | 76.48% |

FIG. 4

METHOD AND SYSTEM FOR ANALYZING TEXTS

FIELD OF THE INVENTION

The invention relates to a computer-implemented method and a system for analyzing texts, and particularly, but not exclusively, to a method and system for analyzing a piece of text in two or more languages for similarity and especially for sentence pairing.

BACKGROUND OF THE INVENTION

Various computer-based language processing tools have been developed. Among the different language processing techniques, sentences pairing from text databases such as text corpora are gaining growing attention. A text corpus can be a language source such as a document or a database of documents having a large and structured set of texts electronically stored and processed. It may comprise texts in a single language or in multiple languages. Text corpora form important resources for the state-of-the-art language processing technologies such as natural language processing, computational linguistics, and machine translation, etc.

A parallel text relates to two or more texts placed alongside their translations, and a parallel corpus generally refers to translation of the same piece of text in two or more languages. Parallel text alignment or text pairing thus requires the identification of the corresponding texts such as sentences, clauses or phrases forming the text in different languages.

Traditional methods of performing parallel sentence pairing may apply known language processing techniques. For example, a translation-based, bidirectional method has been proposed to extract parallel sentences from English and Persian documents aligned Wikipedia (Extracting An English-Persian Parallel Corpus From Comparable Corpora; Akbar Karimi, Ebrahim Ansari, Bahram Sadeghi Bigham; arXiv preprint arXiv: 1711.00681 (2017)). Other methods may include word embedding-based techniques such as that disclosed in H2@BUCC18: Parallel Sentence Extraction from Comparable Corpora Using Multilingual Sentence Embeddings; Houda Bouamor and Hassan Sajjad; Proceedings of the 11th Workshop on Building and Using Comparable Corpora (BUCC) (2018), which identifies parallel sentence pairs in French-English corpora by following a hybrid approach pairing multilingual sentence-level embeddings, neural machine translation, and supervised classification. Deep learning-based techniques have also been applied to identify parallel sentences in comparable corpora (BUCC 2017 Shared Task: a First Attempt Toward a Deep Learning Framework for Identifying Parallel Sentences in Comparable Corpora (Grégoire & Langlais, BUCC 2017)). Another parallel text sentence aligner, Champollion, is also known as a lexicon-based language processing technique (Champollion: A Robust Parallel Text Sentence Aligner. Xiaoyi Ma, Proceedings of the Fifth International Conference on Language Resources and Evaluation (LREC. 2006)) which supports only alignment of English with Arabic, Chinese and Hindi, and generally performs poorly when the source and the target documents consist of different sentence sequences.

OBJECTS OF THE INVENTION

An object of the present invention is to provide a computer-implemented method and system for analyzing texts.

Another object of the present invention is to mitigate or obviate to some degree one or more problems associated with known computer-based text analytic techniques, or at least to provide a useful alternative.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a computer-implemented method for analyzing texts. The method comprises the steps of identifying one or more sentences of a first text in a first language; identifying one or more sentences of a second text in a second language; translating the identified one or more sentences of the first text from the first language into the second language; processing the sentences of the first text in the second language and the sentences of the second text in the second language into a first representation of the sentences of the first text, and a second representation of the sentences of the second text; and comparing the first representation of sentences of the first text with the second representation of sentences of the second text to identify one or more sentences of similarity between the first text and the second text.

In a second main aspect, the invention provides a system comprising a memory for storing data and a processor for executing computer readable instructions, wherein the processor is configured by the computer readable instructions when being executed to implement the method of the first main aspect.

In a third main aspect, the invention provides a computer-implemented system for analyzing texts. The system comprises an identifying module for identifying one or more sentences of a first text in a first language; and for identifying one or more sentences of a second text in a second language; a translating module for translating the identified one or more sentences of the first text from the first language into the second language; a processing module for processing the sentences of the first text in the second language and the sentences of the second text in the second language into a first representation of the sentences of the first text, and a second representation of the sentences of the second text; and a comparison module for comparing the first representation of sentences of the first text with the second representation of sentences of the second text to identify one or more sentences of similarity between the first text and the second text.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which:

FIG. 4 shows the results of intersection between the embodiment of the present invention and the Champollion.

DESCRIPTION OF PREFERRED EMBODIMENTS

Figure 1:
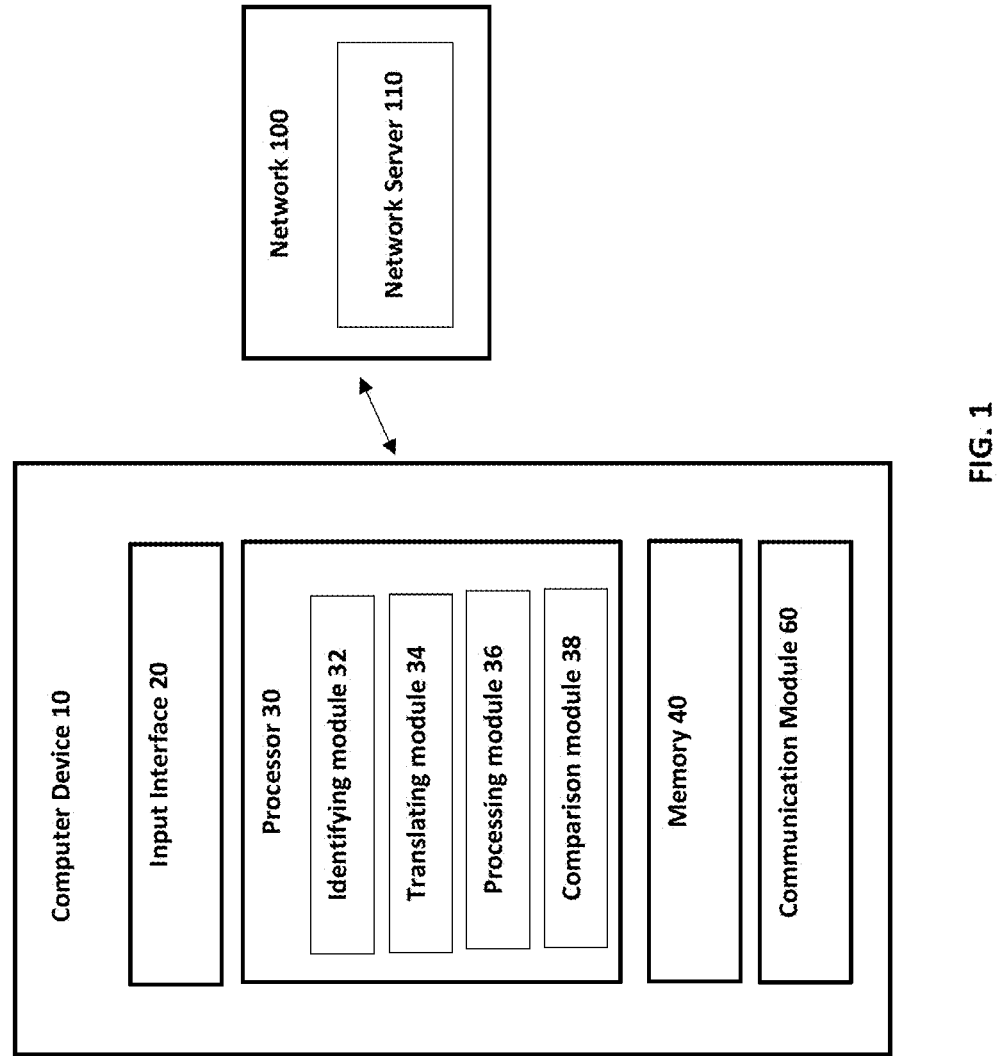
FIG. 1 is a block schematic diagram showing a computer-implemented system for analyzing texts according to the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

It should be understood that the elements shown in the figures may be implemented in various forms of hardware, software, or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of systems or methods embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The present invention relates to a system and a method for analyzing texts and more preferably, a system and a method for analyzing texts for similarity such as by identifying similar sentences, clauses and/or phrases from texts in two or more languages. In one embodiment, the present invention can be applied to pair up or to match two or more sentences from parallel text corpora, such as to identify corresponding sentences of a text or two or more pieces of texts of the same content or different contents in different languages. In general, a parallel text may relate to one or more texts placed alongside with their translation, and a parallel text corpus may relate to the translation of the same piece of text in two or more languages. Parallel text alignment or text pairing thus requires the identification of the corresponding sentences from the texts in different languages. In the context of the present invention, the term "sentence" should be given a broad meaning to cover a set or group of words which can be, but is not limited to, a clause, a phrase, or a group of clauses or phrases in the form of a paragraph which preferably, expresses a statement, an assertion, a question, a command, an exclamation, or the like in a text. The texts can be any form of writings such as articles, essays, stories, poems or literature of any kind. The term "similarity" may generally refer to semantic similarities, i.e., in relation to meaning, and/or syntactic similarities, such as relating to grammar, sentence structure, and part-of-speech, etc.

Figure 2:
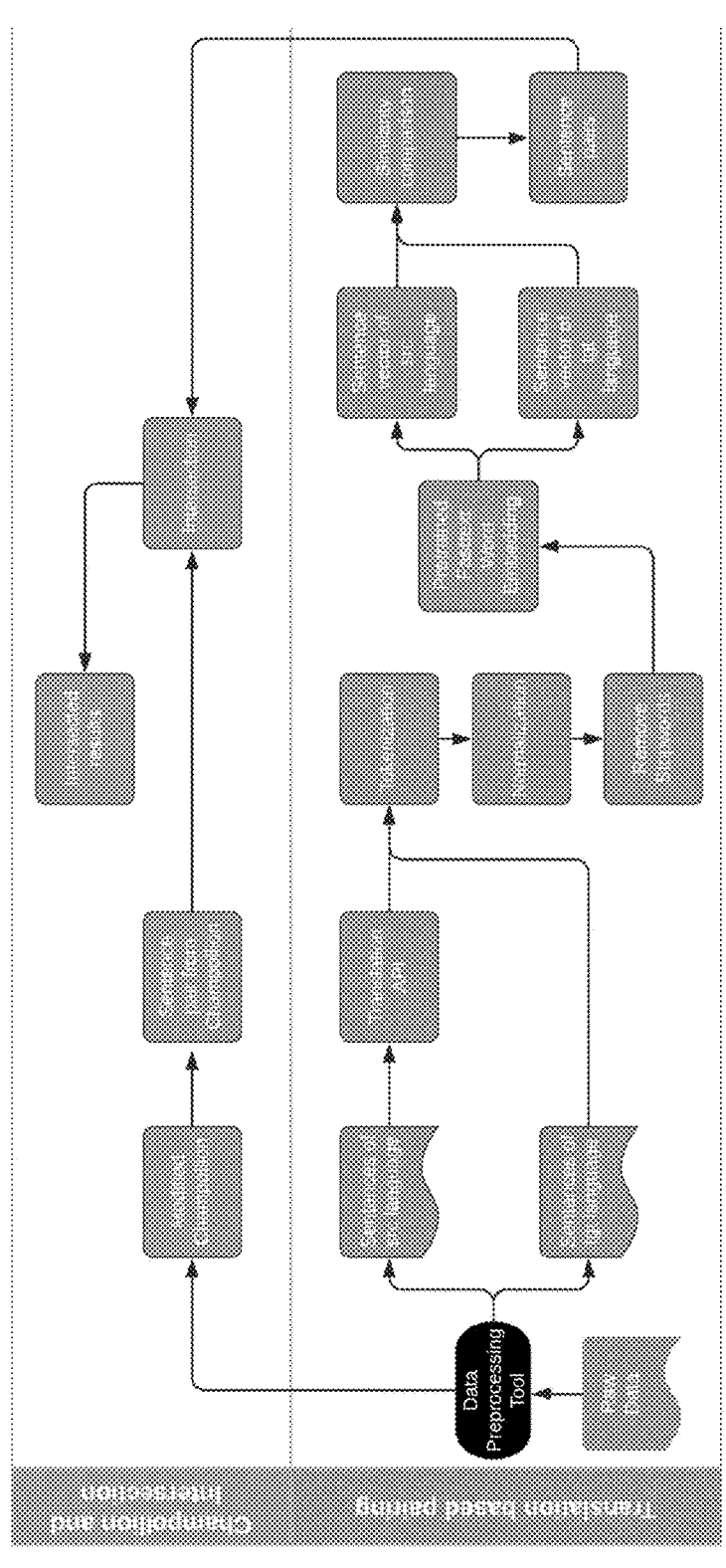
FIG. 2 is a flow diagram showing the embodied steps of a computer-implemented method based on the system of FIG. 1.

Referring to FIG. 1, shown is a block diagram of the system for analyzing texts according to an embodiment of the present invention. FIG. 2 further shows the embodied method steps for analyzing texts as implemented by the system of FIG. 1.

In one embodiment, the system of the present invention can be implemented in a computer device 10 in any known form including desk top computer, laptop computer, tablet computer, smart phones, or any portable electronic smart devices. The system and the method of the present invention may also be implemented by a network server 110. Preferably, the computer device 10 is connectable with a network 100, either private or public such as the internet, via a communication module 60 for exchanging information or data. The network 100 may comprise a communications network.

Specifically, the computer device 10 comprises an input interface 20 for inputting the text materials to be analyzed. For example, a user may typewrite the text via the computer input means, which may comprise, for example, a keyboard or a touch screen panel. The user may also open a pre-typed, scanned or saved text (e.g., in .txt, .doc, .pdf or .jpg format, etc.) which has been previously prepared and saved in the memory 40 of the computer device 10. The user may also download an electronic document of interest, such as in any one or more of .txt, .doc, or .pdf formats or any other formats for electronic processing from the internet 100 via the communication module 60.

The texts will subsequently be processed and analyzed by a processor 30. The processor 30 may comprise a plurality of functional blocks for performing various functions. For example, the processor 30 may comprise a number of modules including an identifying module 32, a translating module 34, a processing module 36 and a comparison module 38, with their respective functions described as follows.

First, the identifying module 32 can be configured to identify or select one or more sentences of a first, source text in a first, source language, and to identify or select one or more sentences of a second, target text in a second, target language. The texts may comprise blocks of words forming one or more sentences, clauses, phrases, or groups of sentences, clauses or phrases in the form of one or more paragraphs. The first language can be any language different to the second, target language. In one embodiment, the step of identifying sentences of texts may comprise truncating the corresponding piece of texts in the structure of sentences based on, for example, the identification of punctuations or stop words, etc. from the texts.

In one embodiment, the texts being analyzed may comprise more than two texts such as, for example, for the first, source text to comprise two or more texts in different languages. In another embodiment, the second, target texts can be required in more than one language such as in two or more different languages. The identification of parallel sentences may further be applicable if the first and the second texts are of the same content or different content.

The translating module 34 will then translate the identified one or more sentences of the first, source text from the first language to the second, target language. The translation can be conducted by any known computer-based language translation tools, for example, translation application programming interfaces (API) such as Google translation API, Amazon translation API, and/or other proprietary translation software or programs.

A processing module 36 will process the sentences of the first, source text which is now translated into the second, target language into a first representation of the sentences of the first text, and also process the sentences of the second text in the second language into a second representation of the sentences of the second text. Particularly, the processing by the processing module 36 may comprise converting the translated sentences of the first text in the second, target language into a first vector, and converting the sentences of the second text in the second language into a second vector, wherein the first vector and the second vector may respectively comprise vectors of numbers. More preferably, the first and the second vectors will then be processed further, via the processing module 36, by generating a representation comprising the first representation based on the first vector and the second representation based on the second vector. In one embodiment, the representation may comprise a two-dimensional representation, although other forms of representations such as a three-dimensional representation, may also be encompassed by the present invention. In one preferred embodiment, the processing step may comprise processing based on a computer algorithm such as a word-embedding algorithm. However, a person skilled in the art will understand that the processing method is not limited by the specific computer model or algorithm, but instead, any other encoding and/or mapping means for the purpose of language processing is also applicable, as long as the variations do not depart from the inventive concept of the present invention.

Preferably or optionally, prior to the generating of the representations based on the sentences of the first text translated to the second, target language and the sentences of the second text in the second, target language, the processing module 32 may first segment or divide data or text of the translated sentences of the first text into a first sequence of tokens and segment or divide data or text of the sentences of the second text in the second language into a second sequence of tokens. The tokenization can be implemented by any known tokenization means by replacing the data with unique identification symbols or tokens. Preferably, the tokenization means dives the respective texts roughly into words. One suitable such tokenization means is the Stanford Tokenizer. The tokenized data will then be normalized and subsequently, be filtered by removing irrelevant word units such as one or more stop words which have no useful meaning in the sentences. The filtered data will then be processed into the representation comprising the first representation of sentences of the translated first text and the second representation of sentences of the second text, as described above.

After generation of the respective representations for the respective sentences of the first and the second texts, the comparison module 38 will then compare the first representation of sentences of the first, source text with the second representation of sentences of the second, target text to identify one or more sentences of similarity between the first text and the second text, and/or to identify a sentence from the target text which is the most similar to a sentence from the source text, or vice versa. In one embodiment, the comparison is conducted by calculating distances, such as by determining cosine distances based on cosine similarity. The cosine distance can be determined between two non-zero vectors respectively of the first representation and the second representation of the generated two-dimensional representation to thereby identify one or more sentences from the translated, first, source text which show the highest degree of similarity to one or more sentences of the second, target text, or vice versa. The shorter is the determined distance, the higher degree of similarity that can be deduced, while the longer is the determined distance, the more dissimilarity is found between the two compared sentences. In one preferred embodiment, the similarity of sentences between the first text and the second text refers to semantic similarity, i.e., relating to the meaning of the sentences, although other types of similarities such as syntax relating to grammar, sentence structure, and part-of-speech, etc. may also be applicable. Similar sentences identified between the first text and the second text can then be paired up to form parallel sentence pairs.

Any suitable means of determining cosine differences may be utilized. One such suitable cosine determining means comprises "Common natural language processing technology] Text similarity Cosine at (II): Similarity" published https://ithelp.ithome.com.tw/articles/10268777.

In one embodiment, the system of the present invention comprises the memory 40 for storing data and the processor 30 for executing computer readable instructions. The processor 30 is configured by the computer readable instructions when being executed to implement the steps of the method as described above.

Figure 3:
FIG. 3 shows the results of accuracy testing from an embodiment of the present invention and a prior art technology, the Champollion.

The accuracy of the system of the present invention is further evaluated and verified by using a known, lexicon-based language processing technique, the Champollion. For the purpose of comparison as shown in FIG. 2, the same source and target texts are processed by both the Champollion and the system of the present invention to identify paired sentences with similar meanings. The resulting paired sentences from the Champollion may then be cross-checked with those identified by the present invention for intersection. The respective results generated by the Champollion and the present invention are shown in FIG. 3, and the intersection results are further shown in FIG. 4. Particularly, two sets of data from each of the Champollion technique and the system of the present invention are generated, namely, (i) by using the original first and second texts of parallel documents as input for the pairing (sec C and D in FIG. 3), and (ii) by shuffling the sentences of one or more of the first and/or the second texts as input for the pairing (see A and B in FIG. 3). It is revealed by the results of FIG. 3 that the pairings by both the Champollion and the present inventions are highly comparable, regardless of whether the texts have been previously shuffled or not. FIG. 4 further reveals the percentage intersections of paired sentences from various sources in different domains between the Champollion and the present invention which, in general, are higher than 58%.

The present invention is advantageous in that it provides a novel system and method for an efficient analysis on texts or pairing of texts in different languages. Particularly, the present invention offers a systematic and accurate method to identify sentence pairs from parallel documents such as from parallel text corpora. The system and the method can be implemented in a computer device which is fast, effective, and user-friendly. The present invention therefore is applicable to improve existing language processing techniques such as natural language processing, computational linguistics, and/or machine translation techniques, etc. The present invention further enables an effective analysis of texts in a computationally efficient manner in that it involves one or more steps which prevent or reduce the unnecessary processing of data. For example, a detailed analysis of literatures or documents having hundreds or thousands of words or sentences can be processed efficiently in seconds. Multiple texts or documents can also be processed and analyzed simultaneously.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A computer-implemented method for aligning different language texts, comprising the steps of:
   employing an identifying module of a computer device or system to select one or more sentences of a first text in a first language;
   employing said identifying module to select one or more sentences of a second text in a second language;
   employing a translation module of the computer device or system to translate the selected one or more sentences of the first text from the first language into the second language using a translation application programming interface (API);
   employing a processing module of the computer device or system to process the sentences of the first text in the second language into a first representation of the sentences of the first text in the second language and to process the sentences of the second text in the second language into a second representation of the sentences of the second text in the second language; and
   employing a comparison module of the computer device or system to compare the first representation of sentences of the first text in the second language with the second representation of sentences of the second text in the second language to determine similarity between the first text and the second text to thereby identify and align one or more corresponding sentences from the first text in the first language with one or more sentences of the second text in the second language to enable alignment of the first text in the first language with the second text in the second language.

2. The computer-implemented method according to claim 1, wherein the processing step comprises employing the processing module of the computer device or system to convert the sentences of the first text in the second language and the sentences of the second text in the second language into corresponding first and second vectors.

3. The computer-implemented method according to claim 2, wherein the processing step further comprises employing the processing module of the computer device or system to generate a representation comprising the first representation based on the first vectors and to generate another representation comprising the second representation based on the second vectors.

4. The computer-implemented method according to claim 3, wherein the processing step comprises processing based on a computer algorithm comprising a word-embedding algorithm.

5. The computer-implemented method according to claim 3, wherein the comparing step comprises employing the comparison module of the computer device or system to calculate distances between the first representation and the second representation to identify and align one or more sentences of the first text in the first language with one or more sentences of the second text in the second language.

6. The computer-implemented method according to claim 2, wherein the comparing step comprises employing the comparison module of the computer device or system to calculate a cosine distance between the first and second vectors.

7. The computer-implemented method according to claim 1, further comprising a step of employing the processing module of the computer device or system to tokenize the sentences of the first text in the second language and the sentences of the second text in the second language prior to the processing step for forming the first and second representations.

8. The computer-implemented method according to claim 7, further comprising a step of employing the processing module of the computer device or system to normalize the tokenized sentences of the first text and the second text.

9. The computer-implemented method according to claim 8, further comprising a step of employing the processing module of the computer device or system to analyze the normalized, tokenized sentences of the first text and the second text by filtering out one or more stop words.

10. A computer system comprising a memory for storing data and a processor for executing computer readable instructions, wherein the processor is configured by the computer readable instructions when being executed to implement the method of:

employing an identifying module of a computer system to select one or more sentences of a first text in a first language;

employing said identifying module to select one or more sentences of a second text in a second language;

employing a translation module of the computer system to translate the selected one or more sentences of the first text from the first language into the second language using a translation application programming interface (API);

employing a processing module of the computer system to process the sentences of the first text in the second language into a first representation of the sentences of the first text in the second language and to process the sentences of the second text in the second language into a second representation of the sentences of the second text in the second language; and employing a comparison module of the computer system to compare the first representation of sentences of the first text in the second language with the second representation of sentences of the second text in the second language to determine similarity between the first text and the second text to thereby identify and align one or more corresponding sentences from the first text in the first language with one or more sentences of the second text in the second language to enable alignment of the first text in the first language with the second text in the second language.

11. A computer-implemented system for aligning different language texts, comprising:

an identifying module for selecting one or more sentences of a first text in a first language; and for selecting one or more sentences of a second text in a second language;

a translating module for translating the selected one or more sentences of the first text from the first language into the second language using a translation application programming interface (API);

a processing module for processing the sentences of the first text in the second language into a first representation of the sentences of the first text in the second language and to process the sentences of the second text in the second language into a second representation of the sentences of the second text in the second language; and a comparison module for comparing the first representation of sentences of the first text in the second language with the second representation of sentences of the second text in the second language to determine similarity between the first text and the second text to thereby identify and align one or more corresponding sentences from the first text in the first language with one or more sentences of the second text in the second language to enable alignment of the first text in the first language with the second text in the second language.

* * * * *